United States Patent [19]

Teach

[11] 3,871,865

[45] Mar. 18, 1975

[54] ETHER AND SULFIDE META-SUBSTITUTED ANILIDES AND THEIR UTILITY AS HERBICIDES

[76] Inventor: Eugene G. Teach, 1929 Downey Pl., El Cerrito, Calif. 94530

[22] Filed: Mar. 21, 1973

[21] Appl. No.: 343,595

Related U.S. Application Data

[62] Division of Ser. No. 90,803, Nov. 18, 1970, abandoned.

[52] U.S. Cl............................ 71/98, 71/70, 71/72, 71/76, 71/77, 71/118, 260/557, 260/558, 260/562
[51] Int. Cl............................................ A01n 9/20
[58] Field of Search.............................. 71/118, 98

[56] References Cited
UNITED STATES PATENTS

| | | | |
|---|---|---|---|
| 2,957,800 | 10/1960 | Hopkins et al. | 260/562 |
| 3,277,107 | 10/1966 | Neighbors | 260/306.8 |
| 3,332,768 | 7/1967 | Freund et al. | 71/118 |
| 3,407,056 | 10/1968 | Schwarz | 71/118 |

FOREIGN PATENTS OR APPLICATIONS

| | | | |
|---|---|---|---|
| 1,141,183 | 1/1969 | United Kingdom | 260/562 |
| 1,219,947 | 6/1966 | Germany | |

OTHER PUBLICATIONS

Baruffini et al., Chem. Abst., Vol. 68 (1968), 77872x.

*Primary Examiner*—Elbert L. Roberts
*Assistant Examiner*—Catherine L. Mills
*Attorney, Agent, or Firm*—Harry A. Pacini; Daniel C. Block; Edwin H. Baker

[57] ABSTRACT

Ether and sulfide meta-substituted anilides having the formula

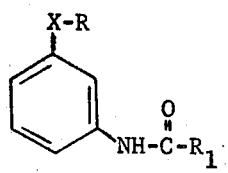

in which X is oxygen or sulfur; R is alkyl, alkenyl, alkynyl, vinyloxyalkyl, alkylthioalkyl, alkyloxyalkyl, ketoalkyl, cinnamyl, and phenacyl; and $R_1$ is alkyl, haloalkyl, alkenyl, cycloalkyl and chlorophenyl; provided that when X is oxygen, R is alkyl, and $R_1$ is haloalkyl, then $R_1$ is other than 1-monohaloalkyl. The compounds of this invention are useful as herbicides.

11 Claims, No Drawings

ETHER AND SULFIDE META-SUBSTITUTED ANILIDES AND THEIR UTILITY AS HERBICIDES

This is a division, of application Ser. No. 90,803 filed Nov. 18, 1970, now abandoned.

This invention relates to certain novel ether and sulfide meta-substituted anilides which are useful as herbicides. The compounds of the present invention are new compositions of matter and correspond to the general formula

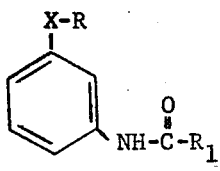

in which X is oxygen or sulfur; R is alkyl, alkenyl, alkynyl, vinyloxyalkyl, alkylthioalkyl, alkyloxyalkyl, ketoalkyl, cinnamyl, and phenacyl; and $R_1$ is alkyl, haloalkyl, alkenyl, cycloalkyl and chlorophenyl. It is provided that when X is oxygen, R is alkyl and $R_1$ is haloalkyl, then $R_1$ is other than 1-monohaloalkyl.

In its preferred form, the invention relates to compositions having the formula

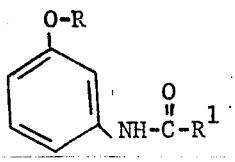

in which R is branched chain alkyl having 5 to 8 carbon atoms, inclusive, and $R^1$ is alkyl having 2 to 7 carbon atoms, inclusive.

In the above description, the following embodiments are intended for the various substituent groups unless otherwise provided; for R, alkyl preferably includes those members which contain 1 to 10 carbon atoms, inclusive, in both straight chain and branched chain configurations, for example, methyl, ethyl, n-propyl, isopropyl, n-butyl, sec.-butyl, 1,1-dimethylbutyl, amyl, isoamyl, 2,4,4-trimethylpentyl, n-hexyl, isohexyl, n-heptyl, n-octyl, isooctyl, nonyl, decyl, and 3,7-dimethyloctyl; for $R_1$, alkyl preferably includes those members which contain from 2 to 6 carbon atoms, inclusive, in straight and branched chain configurations, for example, ethyl, n-propyl, isopropyl, n-butyl, sec.-butyl, amyl, isoamyl, n-hexyl and isohexyl; alkynyl preferably includes those members containing from 3 to 5 carbon atoms, inclusive; alkenyl preferably includes those members containing 3 to 6 carbon atoms, inclusive. The terms vinyloxyalkyl, alkylthioalkyl and alkyloxyalkyl preferably include those members in which the total carbon content is not more than 7, for example, vinyloxymethyl, vinyloxyethyl, vinyloxypentyl, methylthiomethyl, methylthioethyl, methylthiopropyl, ethylthioethyl, ethylthiopentyl, propylthiopropyl, propylthiobutyl, butylthiomethyl, hexylthiomethyl, methyloxymethyl, ethyloxyethyl, ethyloxybutyl, butyloxyethyl, butyloxypropyl, hexyloxymethyl and the like. By the term ketoalkyl is meant those members of the group which have the formula

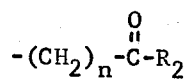

in which $n$ is 1 or 2 and $R_2$ is alkyl containing from 1 to 4 carbon atoms, inclusive, in straight chain and branched chain configurations, for example, methyl, ethyl, n-propyl, isopropyl, n-butyl, sec.-butyl, tert.-butyl and the like. In $R_1$ by the term haloalkyl is meant those members of the group having 1 to 6 carbon atoms, inclusive and having mono to perhalogenation with no more than two different halogens selected from the group fluorine, chlorine and bromine. The term cycloalkyl preferably includes those members of the group which contain from 3 to 6 carbon atoms, inclusive, for example, cyclopropyl, cyclobutyl, cycloamyl and cyclohexyl.

The compounds of this invention have been found to be active herbicides of a general type. That is, certain members of the class have been found to be herbicidally effective against a wide range of plant species. A method of controlling undesirable vegetation of the present invention comprises applying an herbicidally effective amount of the above-described compounds to the area or plant locus where control is desired.

An herbicide is used herein to mean a compound which controls or modifies the growth of plants. By a "growth controlling amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinating seeds, emerging seedlings, and established vegetation including the roots and above-ground portions.

The compounds of the present invention are prepared by several different methods, depending upon the nature of the starting materials and the products desired. Either of the substituents, R or $R_1$, may be attached to the aminophenol first, with the other substituent subsequently added by the appropriate reaction. For example, meta-aminophenol or meta-aminothiophenol may be acylated by reaction with the appropriate acid anhydride or acid chloride to yield the hydroxy or thiol anilide, respectively. The hydroxy or thiol anilide is then converted to the corresponding sodium salt and reacted with an appropriate organic halide in a solvent, such as dimethylformamide, to yield the ether or sulfide meta-substituted anilide. Alternatively, meta-aminophenol or meta-aminothiophenol is converted to the sodium salt in a solvent, such as dimethylformamide. The sodium salt is then reacted with an appropriate organic halide to obtain the corresponding ether or sulfide meta-substituted aniline. The amino group is then acylated as described above with an appropriate acid anhydride or acid chloride. In each instance after the reaction is complete, the recovery of the product is carried out by normal work-up procedures, such as crystallization, sublimation or distillation.

The compounds of the present invention and their preparation are more particularly illustrated by the following examples. Following the examples is a table of compounds which are prepared according to the procedures described herein.

EXAMPLE I

Preparation of 3'-isoamyloxy isobutyranilide.

Twelve and five-tenths (12.5) grams of 3'-isoamyloxy aniline is weighed into a beaker and treated portionwise with 11.1 g. of isobutyric anhydride containing one to two drops of $H_2SO_4$. The mixture becomes very warm and crystallizes on cooling. The solid is washed with water in a blender, filtered and washed with dilute (approximately 1%) NaOH, water and dried in the vacuum oven. There is obtained 16 g. of the title compound, a white solid, m.p. 63°–66°C.

EXAMPLE II

Preparation of 3'-isobutoxy-cyclopropane carboxanilide.

Thirteen and two-tenths (13.2) grams of 3'-isobutoxy aniline is dissolved in 100 ml. of acetone and 9 g. of triethylamine added. The mixture is stirred in a cold water bath and 8.4 g. of cyclopropane carbonyl chloride is added portionwise. When the reaction is complete, the mixture is poured into 500 ml. of cold water and the oily product is taken up in ethyl acetate and washed with dilute NaOH, dilute HCl, water and dried over anhydrous magnesium sulfate. The ethyl acetate is removed under vacuum. There is obtained 15.4 g. of the title compound, $n_D^{30} = 1.5356$.

EXAMPLE III

Preparation of 3'-(3,3-dimethylbutoxy)2-methyl butyranilide.

Thirteen and one-half (13.5) grams of 3'-hydroxy-2-methyl butyranilide is dissolved in 100 ml. of dimethylformamide and 15.1 g. of 25% sodium methoxide in methanol is added. The excess methanol is removed under vacuum and 8.5 g. of 3,3-dimethyl-1-chlorobutane is added and the mixture heated at reflux for one hour and poured into approximately 500 ml. of cold water. The oily product is taken up in methylene chloride and washed with dilute NaOH and water and dried over magnesium sulfate. The $CH_2Cl_2$ is evaporated. There is obtained 11.2 g. of the title compound, $n_D^{30} = 1.5062$.

EXAMPLE IV

Preparation of 3'-(2-keto-3,3-dimethylbutoxy) propionanilide.

Eleven and six-tenths (11.6) grams of 3-hydroxy propionanilide is dissolved in 100 ml. of dimethyl formamide and 15.2 g. of 25% sodium methoxide in methanol is added. the methanol is removed by distillation under vacuum and the DMF solution treated with 12.6 g. of 1-bromopinacolone. Heat is evolved and NaBr precipitated. The mixture is allowed to stir for three hours and is then poured into 500 ml. of cold water. The oily product is taken up in methylene chloride and washed with dilute (approximately 1%) NaOH solution and 5% HCl solution and dried over magnesium sulfate. The solvent is removed under vacuum. There is obtained 15.3 g. of the title product, $n_D^{30} = 1.5162$.

EXAMPLE V

Preparation of 3'(2-keto-3,3-dimethylbutoxy)2-methyl valeranilide.

Twelve and four-tenths (12.4) grams of 3'(2-keto-3,3-dimethylbutoxy) anilide is dissolved in 100 ml. of acetone and 7 grams of triethylamine is added. The solution is stirred in a cold water bath and 8.1 g. of 2-methyl valeryl chloride is added portionwise during five minutes. The solution is allowed to stir and cool to room temperature during thirty minutes and is then poured into approximately 500 ml. of cold water. The product is taken up in ethyl acetate and washed with dilute (approximately 1%) NaOH solution and 5% HCl solution and dried over magnesium sulfate. The solvent is distilled off under vacuum. There is obtained 16.8 g. of the title product, $n_D^{30} = 1.5180$.

The following is a table of the compounds which are prepared according to the aforementioned procedures. Compound numbers have been assigned to them and are used for identification throughout the balance of the specification.

TABLE I

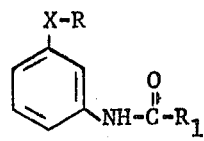

| COMPOUND NUMBER | X | R | $R_1$ | m.p. °C. or $n_D^{30}$ |
|---|---|---|---|---|
| 1 | O | $(CH_3)_3CCH_2CH_2-$ | $C_2H_5-$ | 1.5108 |
| 2 | O | $C_6H_5CH=CH-CH_2-$ | $C_2H_5-$ | 122–124 |
| 3 | O | $(CH_3)_3CCH_2CH_2-$ | $i-C_3H_7-$ | 70–72 |
| 4 | O | $(CH_3)_3CCH_2CH_2-$ | $t-C_4H_9-$ | 94–96 |
| 5 | O | $(CH_3)_3CCH_2CH_2-$ | $C_3H_7CH(CH_3)-$ | 1.5030 |
| 6 | O | $C_6H_5CH=CH-CH_2-$ | $i-C_3H_7-$ | 130–132 |
| 7 | O | $C_6H_5CH=CH-CH_2-$ | $t-C_4H_9-$ | 134.5–136 |
| 8 | O | $C_6H_5CH=CH-CH_2-$ | $C_3H_7CH(CH_3)-$ | 151–152.5 |
| 9 | O | $HC\equiv C-CH_2-$ | $C_2H_5-$ | 76–79 |
| 10 | O | $n-C_5H_{11}-$ | $C_2H_5-$ | 1.5198 |
| 11 | O | $CH_3OCH_2(CH_2)_3-$ | $C_2H_5-$ | 160–165 |
| 12 | O | $n-C_7H_{15}-$ | $C_2H_5-$ | 1.5182 |
| 13 | O | $n-C_{10}H_{21}-$ | $C_2H_5-$ | 46–50 |
| 14 | O | $i-C_4H_9-$ | $t-C_4H_9-$ | 93–96 |
| 15 | O | $(CH_3)_3CCH_2CH_2-$ | $C_2H_5(CH_3)CH$ | 1.5062 |

| COMPOUND NUMBER | X | R | $R_1$ | m.p. °C. or $n_D^{30}$ |
|---|---|---|---|---|
| 16 | O | i—$C_4H_9$— | $C_2H_5$— | 1.5285 |
| 17 | O | i—$C_4H_9$— | $CH_3CCl_2$— | 76–78 |
| 18 | O | i—$C_4H_9$— | $C_3H_7$— | 1.5235 |
| 19 | O | i—$C_4H_9$— | i—$C_3H_7$— | 1.5200 |
| 20 | O | i—$C_4H_9$— | c—$C_3H_5$— | 1.5356 |
| 21 | O | i—$C_4H_9$— | $CH_2ClC(CH_3)_2$— | 1.5269 |
| 22 | O | i—$C_4H_9$— | $(CH_3)_2C=CH$— | 1.5438 |
| 23 | O | i—$C_4H_9$— | $C_2H_5CH(CH_3)$— | 1.5119 |
| 24 | O | i—$C_4H_9$— | $C_3H_7CH(CH_3)$— | 1.5122 |
| 25 | O | i—$C_4H_9$— | $C_3H_7CH(CH_3)_2$— | 1.5069 |
| 26 | O | i—$C_5H_{11}$— | $C_2H_5$— | 1.5230 |
| 27 | O | i—$C_5H_{11}$— | $C_3H_7$— | 1.5210 |
| 28 | O | i—$C_5H_{11}$— | i—$C_3H_7$— | 63–66 |
| 29 | O | i—$C_5H_{11}$— | $C_2H_5CH(CH_3)$— | 1.5119 |
| 30 | O | i—$C_5H_{11}$— | t—$C_4H_9$— | 1.5179 |
| 31 | O | i—$C_5H_{11}$— | $C_3H_7CH(CH_3)$— | 1.5112 |
| 32 | O | $(CH_3)_3CCH_2CH_2$— | $C_3H_7C(CH_3)_2$— | 1.5042 |
| 33 | O | $CH_2=C(CH_3)CH_2$— | $C_2H_5$— | 1.5353 |
| 34 | O | $CH_2=C(CH_3)CH_2$— | i—$C_3H_7$— | 1.5266 |
| 35 | O | $CH_2=C(CH_3)CH_2$— | t—$C_4H_9$— | 1.5266 |
| 36 | O | $CH_2=C(CH_3)CH_2$— | $C_3H_7CH(CH_3)$— | 1.5257 |
| 37 | O | $C_3H_7CH(CH_3)CH_2$— | $C_2H_5$— | 1.5210 |
| 38 | O | $C_3H_7CH(CH_3)CH_2$— | t—$C_4H_9$— | 1.5113 |
| 39 | O | $C_3H_7CH(CH_3)CH_2$— | $C_3H_7CH(CH_3)$— | 1.5099 |
| 40 | O | $(CH_3)_2CH(CH_2)_3CH(CH_3)CH_2CH_2$— | $C_2H_5$ | 1.5061 |
| 41 | O | $(CH_3)_2CH(CH_2)_3CH(CH_3)CH_2CH_2$— | t—$C_4H_9$ | 1.5000 |
| 42 | O | $(CH_3)_2CH(CH_2)_3CH(CH_3)CH_2CH_2$— | $C_3H_7CH(CH_3)$— | 1.4970 |
| 43 | O | $C_2H_5OCH_2CH_2$— | $C_2F_5$— | 97–100 |
| 44 | O | $CH_2=CH—O—CH_2CH_2$— | $C_2H_5$— | 90–93 |
| 45 | O | $CH_2=CH—O—CH_2CH_2$— | $C_3H_7CH(CH_3)$— | 76–78 |
| 46 | O | $CH_2=CH—O—CH_2CH_2$— | $C_3H_7(CH_3)_2$— | 61–64 |
| 47 | O | $(CH_3)_2C—CH$— | $C_2H_5$— | 1.5222 |
| 48 | S | $(CH_3)_3CCH_2CH_2$— | $C_2H_5CH(CH_3)$— | 1.5389 |
| 49 | O | $(CH_3)_3CCOCH_2$— | $C_2H_5$— | 1.5162 |
| 50 | O | $(CH_3)_3CCOCH_2$— | i—$C_3H_7$— | 1.5182 |
| 51 | O | $(CH_3)_3CCOCH_2$— | t—$C_4H_9$— | 1.5119 |
| 52 | O | $(CH_3)_3CCOCH_2$— | $C_3H_7C(CH_3)_2$— | 1.5056 |
| 53 | O | $C_6H_5COCH_2$— | $C_2H_5$— | 123–127 |
| 54 | O | $C_6H_5COCH_2$— | i—$C_3H_7$— | 1.5195 |
| 55 | O | $C_6H_5COCH_2$— | t—$C_4H_9$— | 1.5830 |
| 56 | O | $(CH_3)_3CCOCH_2$— | $(C_2H_5)_2CH$— | 1.5170 |
| 57 | O | $(CH_3)_3CCOCH_2$— | 3,3—$Cl_2C_6H_3$— | 1.5768 |
| 58 | O | $CH_3COCH_2$— | $C_2H_5$— | 1.4805 |
| 59 | O | $CH_3COCH_2$— | i—$C_3H_7$— | 1.4872 |
| 60 | O | $(CH_3)_3CCOCH_2$— | $(CH_3)_3CCH_2$— | 90–95 |
| 61 | O | $(CH_3)_3CCOCH_2$— | $C_2H_5CH(CH_3)$— | 1.5239 |
| 62 | O | $(CH_3)_3CCOCH_2$— | $C_3H_7CH(CH_3)$— | 1.5180 |
| 63 | O | t—$C_4H_9$—S—$CH_2$— | $C_2H_5$— | 1.5322 |
| 64 | O | t—$C_4H_9$—S—$CH_2$— | $C_3H_7CH(CH_3)$— | 1.5296 |
| 65 | O | t—$C_4H_9$—S—$CH_2$— | $C_3H_7C(CH_3)_2$— | 1.5238 |

Other examples of compounds falling within the generic formulas presented herein, which are preparable by the aforedescribed procedures and which may be formulated into herbicidal compositions and applied as herein illustrated are:

| X | R | $R_1$ |
|---|---|---|
| S | $(CH_3)_3CCH_2CH_2$— | $C_2H_5$— |
| S | $C_6H_5CH=CH—CH_2$— | $C_2H_5$— |
| S | $(CH_3)_3CCH_2CH_2$— | i—$C_3H_7$— |
| S | $(CH_3)_3CCH_2CH_2$— | t—$C_4H_9$— |
| S | HC≡C—$CH_2$— | $C_2H_5$— |
| S | n—$C_5H_{11}$— | $C_2H_5$— |
| S | $CH_3OCH_2(CH_2)_3$— | $C_2H_5$— |
| S | n—$C_{10}H_{21}$— | $C_2H_5$— |
| S | i—$C_4H_9$— | c—$C_3H_5$— |
| S | i—$C_4H_9$— | $CH_2ClC(CH_3)_2$— |
| S | i—$C_5H_{11}$— | $C_2H_5CH(CH_3)$— |
| S | $CH_2=C(CH_3)CH_2$— | $C_2H_5$— |
| S | $CH_2=C(CH_3)CH_2$— | $C_3H_7CH(CH_3)$— |
| S | $CH_2=CH—O—CH_2CH_2$— | $C_2H_5$— |
| S | $CH_2=CH—O—CH_2CH_2$— | $C_3H_7CH(CH_3)$— |
| S | $(CH_3)_3CCOCH_2$— | $C_2H_5$— |
| S | $(CH_3)_3CCOCH_2$— | i—$C_3H_7$— |
| S | $(CH_3)_3CCOCH_2$— | $C_3H_7C(CH_3)_2$— |
| S | $C_6H_5COCH_2$— | $C_2H_5$— |
| S | $CH_3COCH_2$— | $C_2H_5$— |
| S | $CH_3COCH_2$— | i—$C_3H_7$— |
| S | i—$C_4H_9$—S—$CH_2$— | $C_2H_5$— |
| S | t—$C_4H_9$—S—$CH_2$— | $C_3H_7C(CH_3)_2$— |

HERBICIDAL SCREENING TESTS.

As previously mentioned, the herein described compounds produced in the above-described manner are phytotoxic compounds which are useful and valuable in controlling various plant species. Compounds of this invention are tested as herbicides in the following manner.

Pre-emergence herbicide test. On the day preceding treatment, seeds of seven different weed species are planted in individual rows using one species per row across the width of the flat. The seeds used are hairy crabgrass (*Digitaris sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1% Tween 20 (polyoxyethylene sorbitan monolaurate). The following day each flat is sprayed at the rate of 20 pounds of the candidate compound per 142 gallons of solution per acre. An atomizer is used to spray the solution onto the soil surface. The flats are placed in a greenhouse at 80°F. and watered regularly. Two weeks later the degree of weed control is determined by comparing the amount of germination and growth of each weed in the treated flats with weeds in several untreated control flats. The rating system is as follows:

0 = no significant injury (approximately 0–10 per cent control)

3 = slight injury (approximately 10–40 per cent control)

6 = moderate injury (approximately 40–70 per cent control)

9 = severe injury or death (approximately 70–100 per cent control)

An activity index is used to represent the total activity on all seven weed species. The activity index is the sum of the numbers divided by 3, so that an activity index of 21 represents complete control of all seven weeds. The results of this test are reported in Table II.

Post-emergence herbicide test. Seeds of five weed species, including hairy crabgrass, watergrass, California red oats, Indian mustard, and curly dock and one crop pinto beans (*Phaseolus vulgaris*), are planted in flats as described above for pre-emergence screening. The flats are placed in the greenhouse at 72°–85°F. and watered daily with a sprinkler. About 10 to 14 days after planting, when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20 (polyoxyethylene sorbitan monolaurate) and then adding 5 ml. of water. The solution is sprayed on the foliage using an atomizer. The spray concentration is 0.5% and the rate would be approximately 20 lb/acre if all of the spray were retained on the plant and the soil, but some spray is lost, so it is estimated that the application rate is approximately 12.5 lb/acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the pre-emergence test where (0), (3), (6), and (9) are used for the different rates of injury and control. The injury symptoms are also recorded. The maximum activity index for complete control of all the species in the post-emergence screening test is 18, this index represents the sum of the rating numbers obtained with the six plant species used in the test divided by 3. The herbicide activity index is shown in Table II.

TABLE II

HERBICIDAL ACTIVITY
SCREENING RESULTS

| COMPOUND NUMBER | HERBICIDAL ACTIVITY INDEX** | |
|---|---|---|
| | Pre-emergence (20 lb/A) | Post-emergence (12.5 lb/A) |
| 1 | 11 | 18 |
| 2 | 2 | 12 |
| 3 | 12 | 18 |
| 4 | 10 | 16 |
| 5 | 12 | 18 |
| 6 | 0 | 8 |
| 7 | 0 | 6 |
| 8 | 3 | 1 |
| 9 | 2 | 12 |
| 10 | 5 | 14 |
| 11 | 2 | 8 |
| 12 | 8 | 14 |
| 13 | 7 | 11 |
| 14 | 11 | 12 |
| 15 | 12 | 13 |
| 16 | 17 | 13 |
| 17 | 2 | 15 |
| 18 | 10 | 11 |
| 19 | 17 | 13 |
| 20 | 12 | 13 |
| 21 | 2 | 8 |
| 22 | 13 | 12 |
| 23 | 6 | 8 |
| 24 | 16 | 13 |
| 25 | 16 | 14 |
| 26 | 15 | 17 |
| 27 | 6 | 12 |
| 28 | 10 | 12 |
| 29 | 9 | 10 |
| 30 | 12 | 14 |
| 31 | 16 | 17 |
| 32 | 11 | 12 |
| 33 | 0 | 9 |
| 34 | 7 | 8 |
| 35 | 14 | 9 |
| 36 | 10 | 14 |
| 37 | 12 | 16 |
| 38 | 9 | 14 |
| 39 | 15 | 15 |
| 40 | 9 | 13 |
| 41 | 6 | 12 |
| 42 | 6 | 9 |
| 43 | 18 | 11 |
| 44 | 2 | 9 |
| 45 | 5 | 10 |
| 46 | 8 | 12 |
| 47 | 6 | 5 |
| 48 | 0 | 5 |
| 49 | 13 | 18 |
| 50 | 15 | 18 |
| 51 | 17 | 17 |
| 52 | 14 | 18 |
| 53 | 3 | 7 |
| 54 | 8 | 8 |
| 55 | 3 | 5 |
| 56 | 5 | 10 |
| 57 | 0 | 6 |
| 58 | 4 | 11 |
| 59 | 2 | 9 |
| 60 | 10 | 9 |
| 61 | 15 | 14 |
| 62 | 18 | 15 |
| 63 | 12 | 17 |
| 64 | 4 | 10 |
| 65 | 8 | 12 |

**21 = 70–100% control of all seven plant species tested pre-emergence.
18 = 70–100% control of all six plant species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like, in the form and manner required. The mixtures can be dispersed in water with the aid of a wetting agent or they can be employed in organic liquid compositions, oil and water, water in oil emulsions, with or without the addition of wetting, dispersing or emulsifying agents. An herbicidally effective amount depends upon the nature of the seeds or plants to be controlled and the rate of application varies from 1 to approximately 50 pounds per acre.

The phytotoxic compositions of this invention employing an herbicidally effective amount of the compound described herein are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least ½ inch below the soil surface. It is not necessary that the phytotoxic compositions be admixed with the soil particles since these compositions also can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds includes, for example, 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis(3-methoxypropylamino)-6-methyl-thio-s-triazine; 2-chloro-4-ethylamino-6-isopropylamino-s-triazine, and 2-ethylamino-4-isopropylamino-6-methylmercapto-s-triazine, urea derivatives, such as 3-(3,4-dichlorophenyl)-1,1-dimethyl urea and 3-(p-chlorophenyl)-1,1-dimethyl urea and acetamides such as N,N-diallyl-α-chloroacetamide, N-(α-chloroacetyl)hexamethylene imine, and N,N-diethyl-α-bromacetamide, and the like; benzoic acids such as 3-amino-2,5-dichlorobenzoic; and thiocarbamates, such as S-propyl dipropylthiocarbamate; S-ethyl-dipropylthiocarbamate, S-ethylcyclohexyl-ethyl-thiocarbamate, S-ethyl hexahydro-1H-azepine-1-carbothioate and the like. Fertilizers useful in combination with the active ingredients include, for example, ammonium nitrate, urea and superphosphate. Other useful additaments include materials in which plant organisms take root and grow, such as compost, manure, humus, sand and the like.

The concentration of a compound of the present invention, constituting an effective amount in the best mode of administration in the utility disclosed, is readily determinable by those skilled in the art.

Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A method for controlling the growth of vegetation which comprises applying to the locus wherein control is desired, an herbicidally effective amount of a compound having the formula

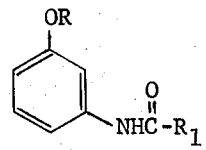

in which R is ketoalkyl of the formula

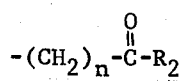

in which $n$ is 1 or 2 and $R_2$ is alkyl containing from 1 to 4 carbon atoms, inclusive, and $R_1$ is alkyl containing from 2 to 6 carbon atoms, inclusive.

2. A method according to claim 1 in which R is 3,3-dimethyl-2-butanonyl and $R_1$ is ethyl.

3. A method according to claim 1 in which R is 3,3-dimethyl-2-butanonyl and $R_1$ is isopropyl.

4. A method according to claim 1 in which R is 3,3-dimethyl-2-butanonyl and $R_1$ is tert.-butyl.

5. A method according to claim 1 in which R is 3,3-dimethyl-2-butanonyl and $R_1$ is 1,1-dimethylbutyl.

6. A method according to claim 1 in which R is 3,3-dimethyl-2-butanonyl and $R_1$ is sec.-butyl.

7. A method according to claim 1 in which R is 3,3-dimethyl-2-butanonyl and $R_1$ is 1-methylbutyl.

8. A method for controlling the growth of vegetation which comprises applying to the locus wherein control is desired, an herbicidally effective amount of a compound having the formula

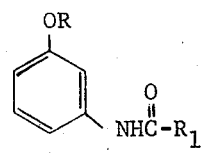

in which R is vinyloxyalkyl in which the total carbon content is not more than 7, and $R_1$ is alkyl containing from 2 to 6 carbon atoms, inclusive.

9. A method for controlling the growth of vegetation which comprises applying to the locus wherein control is desired, an herbicidally effective amount of a compound having the formula

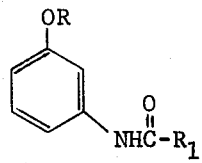

in which R is alkylthioalkyl in which the total carbon content is not more than 7 and $R_1$ is alkyl containing from 2 to 6 carbon atoms, inclusive.

10. A method for controlling the growth of vegetation which comprises applying to the locus wherein control is desired, an herbicidally effective amount of a compound having the formula
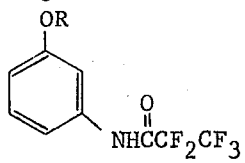
in which R is alkyloxyalkyl in which the total carbon content is not more than 7.
11. A method according to claim 10 in which R is ethoxyethyl.
* * * * *

UNITED STATES PATENT OFFICE
CERTIFICATE OF CORRECTION

PATENT NO. : 3,871,865
DATED : March 18, 1975
INVENTOR(S) : Eugene G. Teach

It is certified that error appears in the above-identified patent and that said Letters Patent are hereby corrected as shown below:

The Title and Abstract Page should contain the following:

[73] Assignee: STAUFFER CHEMICAL COMPANY,
Westport, Connecticut 06880

Signed and Sealed this

Twenty-fifth Day of January 1977

[SEAL]

Attest:

RUTH C. MASON
*Attesting Officer*

C. MARSHALL DANN
*Commissioner of Patents and Trademarks*